L. McMURRAY.
SOLDERING APPARATUS.
No. 171,625. Patented Dec. 28, 1875.
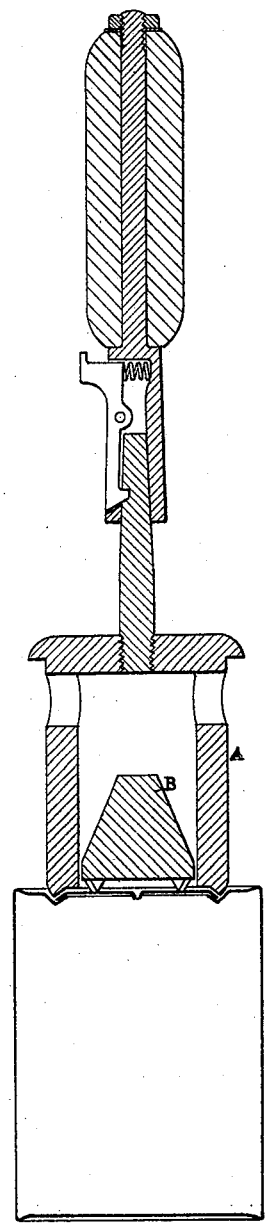
WITNESSES.
Theodore Mungen.
H. A. Daniels.
INVENTOR.
Louis McMurray,
by A.H. & W.T. Howard
Attorney.

UNITED STATES PATENT OFFICE.

LOUIS McMURRAY, OF BALTIMORE, MARYLAND.

IMPROVEMENT IN SOLDERING APPARATUS.

Specification forming part of Letters Patent No. 171,625, dated December 28, 1875; application filed August 14, 1875.

*To all whom it may concern:*

Be it known that I, LOUIS McMURRAY, of the city of Baltimore, in the State of Maryland, have invented certain Improvements in Closing Oyster, Fruit, and other Cans, of which the following is a specification, reference being had to the accompanying drawing, forming a part hereof.

In the drawing referred to is shown a vertical section of a can and the appliances used in capping the same according to my invention.

The object of this improvement is to facilitate and cheapen the operation of capping or soldering up the cans.

An approved method heretofore has been to use a hollow soldering-iron, such as is shown in the annexed drawing by A, having, however, a presser-rod made to rest upon the can-cap. In that method, as in the present, the soldering-iron employed has a face shaped to correspond with the crease of the can, the soldering-iron being made to rest upon a ring of solder, which is thus caused to melt and flow in the crease and close the can. In the old method referred to the can-cap is, during the closing process, held down by the presser-rod, which passes through the soldering-iron centrally thereof.

Another method of holding down the cap during the melting of the solder in the crease is, to make a portion of the iron to rest upon the top of the cap. In this case the cap sustains the entire weight of the iron, as the portion thereof entering the crease does not extend entirely to the bottom of the crease, but clears the point of contact between the cap and can sufficiently to admit of the formation thereat of an annular body of solder.

My present improvement consists in placing upon the cap an independent weight, B, of ample weight to keep the cap in place, but small enough in size to enable it to be covered by the hollow soldering-iron.

In using my invention, a number of filled cans are placed in convenient positions with the caps in place, as shown in the drawing, and a ring or particles of solder are put in the crease. A weight, B, is placed upon the top of each can, and the heated soldering-iron applied to each can in turn, each weight being left in place after the soldering-iron has done its work and been removed. The weights are afterward removed.

It is thus seen that the melting of the solder on each can, which is only the work of an instant, is all the soldering-iron is expected to accomplish.

The thorough setting of the solder is absolutely necessary to insure a tight can, and it is known that the steam generated by the heat of the soldering-iron causes a movement of the cap and tendency to lift, which can only be prevented by a pressure upon the cap exerted sufficiently long to enable the solder to become fixed. To admit of the escape of the steam from the vent-hole of the cap, I prefer to give to the weight B small feet, as shown. The same result can, however, be obtained by means of a weight of almost any shape. It may be solid or perforated, the shape being immaterial, and I do not restrict my claim, either as to the size, shape, or general construction of the weight. The weight must, however, be detached from the soldering-iron and independent of it, and inclosed within it.

I claim as new, and wish to secure by Letters Patent of the United States—

The combination of a cylindrical or hollow soldering-iron with a separate and inclosed weight, for steadying the can-cap during and after the melting of the solder, substantially as specified.

In testimony whereof I have hereunto subscribed my name this 7th day of July, in the year of our Lord 1875.

LOUIS McMURRAY.

Witnesses:
GEO. V. METZEL,
E. F. HOOK,
FRANK GOODE.